United States Patent [19]

Nakarai et al.

[11] Patent Number: 4,757,188
[45] Date of Patent: Jul. 12, 1988

[54] INFORMATION READING/PROCESSING SYSTEM FOR RECORDED INFORMATION USING FLUOPHOR

[75] Inventors: Masazumi Nakarai, Anjo; Naoki Tokitsu, Chiryu, both of Japan

[73] Assignee: Nippondenso Co., Ltd., Kariya, Japan

[21] Appl. No.: 804,340

[22] Filed: Dec. 5, 1985

Related U.S. Application Data

[62] Division of Ser. No. 496,216, May 19, 1983, abandoned.

[30] Foreign Application Priority Data

| May 26, 1982 | [JP] | Japan | 57-90310 |
| Jun. 3, 1982 | [JP] | Japan | 57-95276 |
| Jun. 16, 1982 | [JP] | Japan | 57-104184 |
| Jul. 1, 1982 | [JP] | Japan | 57-114488 |
| Jul. 3, 1982 | [JP] | Japan | 57-115713 |
| Jul. 20, 1982 | [JP] | Japan | 57-126875 |

[51] Int. Cl.⁴ ............ G06K 7/10; G06K 7/14
[52] U.S. Cl. .................... 235/454; 235/468; 235/487; 235/491
[58] Field of Search ........... 235/454, 482, 491, 462, 235/468, 487

[56] References Cited

U.S. PATENT DOCUMENTS

| 3,585,612 | 6/1971 | Corbaz | 235/454 |
| 3,614,430 | 10/1971 | Berler | 235/491 |
| 3,763,356 | 10/1973 | Berler | 235/491 |
| 3,812,347 | 5/1974 | Cunningham | 235/472 |
| 3,935,431 | 1/1976 | Scheffel | 235/468 |
| 3,946,203 | 3/1976 | Hecht | 235/491 |
| 4,187,980 | 2/1980 | Schisselbauer | 235/482 |
| 4,202,491 | 5/1980 | Suzuki | 235/497 |
| 4,317,029 | 2/1982 | Warthan | 235/454 |
| 4,476,468 | 10/1984 | Goldman | 235/468 |
| 4,538,059 | 8/1985 | Rudland | 235/468 |

*Primary Examiner*—Harold I. Pitts
*Attorney, Agent, or Firm*—Cushman, Darby & Cushman

[57] ABSTRACT

A first member and a second member are coupled so as to form a flat card path therebetween. The card path is open at one end of each of the first and second members. A plurality of guide holes are formed in the first member so as to open to the card path. The guide holes are substantially perpendicular to the card path. A plurality of light-emitting elements are respectively mounted in the guide holes such that a light-emitting direction of each light-emitting element crosses the card path. A plurality of photodetector chambers are formed in the second member such that each photodetector has an optical axis aligned with that of each light-emitting element. A plurality of light-receiving elements are housed in the photodetector chambers so as to receive only light beams having a predetermined wavelength through respective filters. An information card having pattern data formed by a fluophor thereon is inserted along the card path, thereby allowing reading of the pattern data by the light-receiving elements.

13 Claims, 5 Drawing Sheets

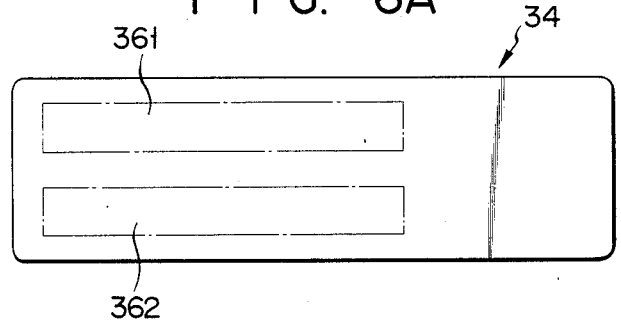
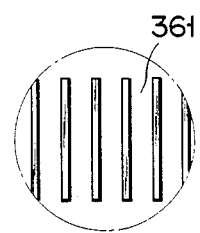
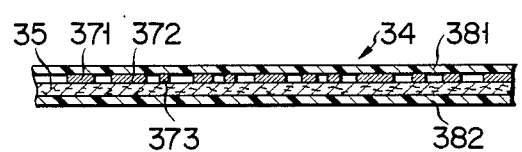
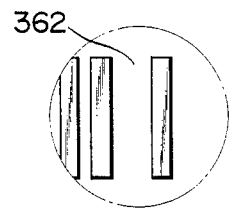
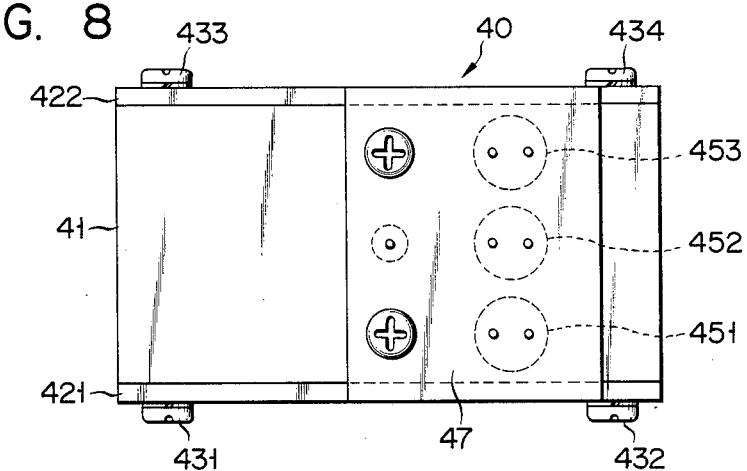
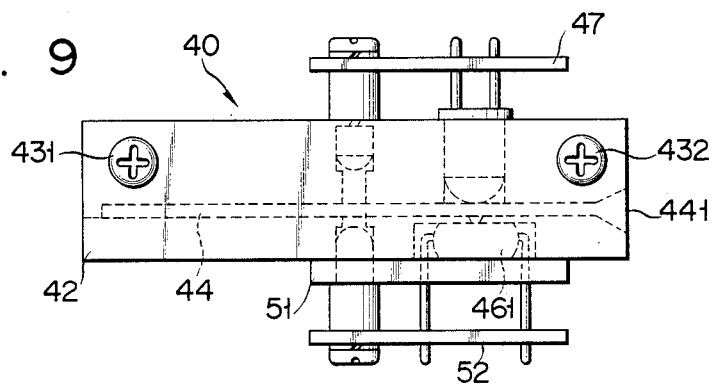

INFORMATION READING/PROCESSING SYSTEM FOR RECORDED INFORMATION USING FLUOPHOR

This is a division of application Ser. No. 496,216, filed May 19, 1983, which was abandoned upon the filing hereof, now abandoned.

BACKGROUND OF THE INVENTION

The present invention relates to an information reading/processing system for a recording medium on which a data pattern is formed using a fluophor and, more particularly, to an information reading/processing system for reading a data pattern formed by a fluophor on a card-like recording medium.

It is known that a light ray having a specific wavelength is emitted from a fluophor when light is incident on the fluophor. For example, when an infrared ray with a wavelength λa is produced by an infrared source and is radiated onto the fluophor, a light ray with a wavelength λb is emitted from the fluophor.

In order to optically read out the data pattern written on the recording medium, a data pattern recorded portion of the recording medium is scanned with light, and reflected light is then optically detected. When the data pattern is recorded using a fluophor, a light ray having a wavelength λb is selectively filtered, and the light reflected by the fluophor is detected, thereby effectively reading out data recorded on the recording medium.

In general, in order to excite the fluophor so as to readily read out data from the recording medium, light energy must be radiated onto the fluophor For example, a high-power LED of about 10 mW to 50 mW must be used to properly excite the fluophor. Furthermore, in order to read out data by means of the reflected light rays (corresponding to the data pattern) from the fluophor, a beam spot having a beam angle of 5° (half-power width) is formed on the data pattern so as to scan the pattern with the beam. For this purpose, an LED with a convex lens is used. Alternatively, an excitation light source system must be arranged wherein a convex lens is disposed along an optical axis so as to oppose the fluophor of the LED.

The filter extracts only the exciting light waves having a wavelength λb and transmits them to a light-receiving element for reading and detecting data. Light reflected by the recording medium and incident thereon must be collimated light. For this purpose, a light guide must be disposed between the fluophor of the recording medium and the filter so as to collimate the light reflected by the fluophor which has the data pattern. The light guide comprises a special lens system which has an infinite focal length from the physical viewpoint. As a result, the information reader becomes large in size.

In the information reader wherein the data pattern of the fluophor is scanned with a beam spot and light reflected by the fluophor is read, a large scale configuration must be utilized at high cost. Furthermore, in order to accurately read out the recorded data, assembly must be performed with high precision.

SUMMARY OF THE INVENTION

It is a main object of the present invention to provide a simple and compact information reading/processing system so as to properly read out a data pattern recorded on a recording medium using a fluophor.

It is another object of the present invention to effectively utilize a card-like recording medium without using a complex optical element.

It is still another object of the present invention to provide an information reading/processing system for properly reading out recorded data (recorded on the fluophor) which includes a synchronizing (sync) signal, even when a card-like recording medium is used.

It is still another object of the present invention to provide a system wherein information on the information card cannot be visually observed so as to improve confidentiality while recorded data is being optically read out.

According to the information reading/processing system of the present invention, a data pattern is recorded utilizing a fluophor which emits light having a predetermined wavelength, and is optically read out and processed. The information reading/processing system has a light source for producing light so as to excite the fluophor, a filter for filtering light from the fluophor which has a predetermined wavelength, and a light-receiving element for detecting light passing through the filter. The optical axes of the light source, the filter and the light-receiving element are aligned along a single line. A recording medium such as a card having a predetermined data pattern recorded by a fluophor on a light-transmitting member is inserted to travel across an optical path between the light source and the filter.

According to the information reading/processing system, only one optical path is formed between the light source and the filter and the recording medium is moved across the optical path, so that the light source, the filter and the light-receiving element are aligned along a single line and are adjacent to each other. Therefore, a compact reader can be obtained, and a complex optical system can be omitted. In particular, a simple and compact card reader can be obtained.

BRIEF DESCRIPTION OF THE DRAWINGS

FIG. 6A is a plan view of an information card used in the reader shown in FIG. 1;

FIG. 6B is a sectional view of a portion of the card (FIG. 6A) which corresponds to the data pattern;

FIGS. 7A and 7B show the recorded states of the card wherein sync signals and data are respectively recorded on the card;

FIG. 8 is a plan view of a reader according to a second embodiment of the present invention;

FIG. 9 is a front view of the reader shown in FIG. 8;

DETAILED DESCRIPTION OF THE PREFERRED EMBODIMENTS

Figure 1:
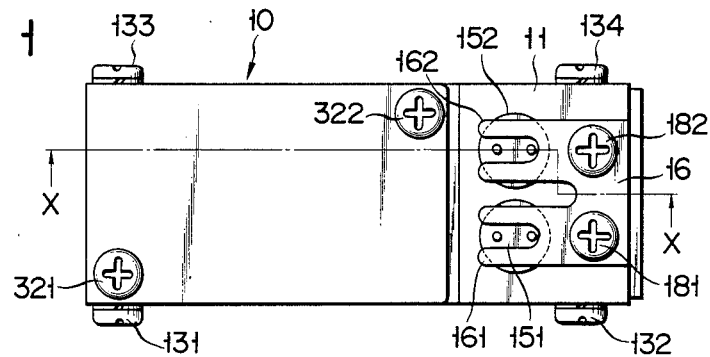
FIG. 1 is a plan view of a reader according to a first embodiment of the present invention.
Figure 2:
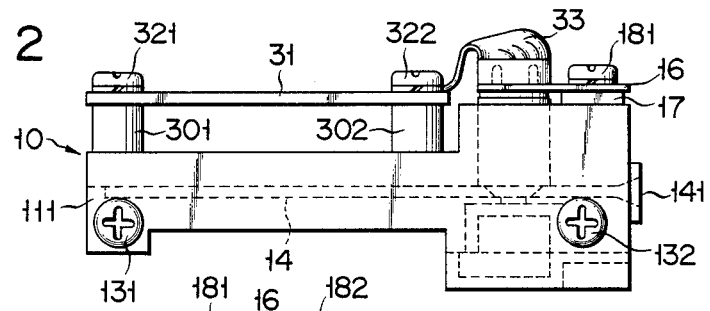
FIG. 2 is a front view of the reader shown in FIG. 1.
Figure 3:
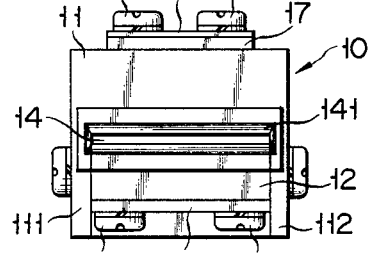
FIG. 3 is a side view of the reader shown in FIG. 1.
Figure 4:
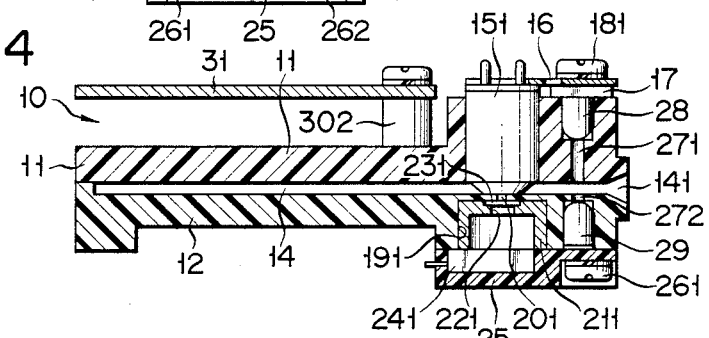
FIG. 4 is a sectional view of the reader shown in FIG. 1 taken along the line X—X.

FIGS. 1 to 4 show a reader 10 of an information reading/processing system according to a first embodiment of the present invention. The reader 10 basically comprises a first member 11 and a second member 12. The first and second members 11 and 12 comprise a synthetic resin material and are combined so as to oppose flat surfaces thereof. A pair of legs 111 and 112 extending downward at the two sides of the first member 11 are brought into tight contact with the two sides of the second member 12, and the first member 11 to the second member 12 are coupled by means of screws 131 to 134. A recess is formed in the flat surface of the first member 11 which opposes the second member 12. The recess is open at one end of each of the first and second members 11 and 12, thereby forming a flat card path 14 open at one end thereof. An opening at the open end is defined as a card insertion port 141.

Figure 5:
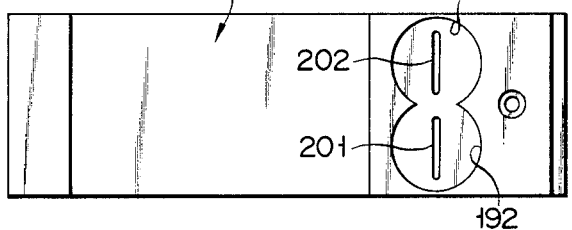
FIG. 5 is an inner view of the reader shown in FIG. 1 when a second member thereof is disassembled.

Two guide holes are formed in the flat surface of the first member 11 which defines the card path 14. Light-emitting elements (LEDs) 151 and 152 are fitted in the guide holes so as to be perpendicular to the flat surface of the first member 11. A line connecting the light-emitting elements 151 and 152 is perpendicular to a card insertion direction. The light-emitting elements 151 and 152 are movably disposed in the holes and are held by press members 161 and 162 of a leaf spring 16, respectively. The leaf spring 16 is fixed by screws 181 and 182 to the first member 11 through spacers 17, respectively. The light-emitting elements 151 and 152 are elastically biased so as to extend upward from the card path 14. Therefore, when the operator inserts a card in the card path 14 through the card insertion port 141, the light-emitting elements 151 and 152 are moved upward against the biasing force of the leaf spring 16 and are thus brought into tight contact with the moving surface of the card. The light-emitting surfaces of the light-emitting elements 151 and 152 are moved relative to the surface of the card, as the card is inserted along the card path 14. Photodetector chambers 191 and 192 are formed in the surface of the second member 12 in alignment with the optical axes of the light-emitting elements 151 and 152. These photodetector chambers 191 and 192 are illustrated in detail in FIG. 5. The photodetector chambers 191 and 192 are open at their lower ends. The photodetector chambers 191 and 192 are respectively open to the card path 14 by means of slits 201 and 202 which extend in a direction perpendicular to the card insertion direction.

Since filter holders 211 and 212 (the filter holder 212 is not illustrated) are fitted in the photodetector chambers 191 and 192, respectively, openings 221 and 222 (the opening 222 is not illustrated) corresponding to the slits 201 and 202 are formed in the filter holders 211 and 212, respectively. Filters 231 and 232 (the filter 232 is not illustrated) are fitted in the openings 221 and 222, respectively. The filters 231 and 232 are arranged to pass only light which has a wavelength λb. The filters 231 and 232 comprise semiconductor light-absorbing filters, respectively; for example, a monocrystalline compound of Group III-IV such as InP or GaAs is used at a thickness of 1 mm or less.

Light beams from the light-emitting elements 151 and 152 are incident on the filter holders 211 and 212 through the slits 201 and 202 and the filters 231 and 232, respectively. Light-receiving elements 241 and 242 (the light-receiving element 242 is not illustrated) each of which comprises a photodiode are disposed in the openings of the filter holders 211 and 212, respectively. The light-receiving elements 241 and 242 together with the filter holders 211 and 212 are held by a holder 25. The holder 25 is fixed by screws 261 and 262 to the second member 12.

Openings 271 and 272 are formed in the first and second members 11 and 12, respectively, in the vicinity of the card insertion port 141 so as to open to the card path 14. An LED 28 is disposed in the opening 271 so as to emit light toward the card path 14. A photodiode 29 is disposed in the opening 272 to receive light from the card path 14. The LED 28 and the photodiode 29 constitute a photointerruptor which optically detects that the information card is inserted through the card insertion port 141.

A circuit board 31 is screwed by screws 321 and 322 above the first member 11 through collars 301 and 302 as spacers. A signal processing circuit for the light-emitting elements 151 and 152 and the LED 28 is formed on the circuit board 31. In particular, the light-emitting elements 151 and 152 are connected by a wiring circuit 33 which comprises a flexible printed wiring material.

FIGS. 6A and 6B show an information card 34 used with the reader 10. The information card 34 has a rectangular shape. The width of the information card allows insertion of the card in the card insertion port 14. The information card 34 has a base paper 35 which transmits light therethrough and which is roughened to be suitably coated with a fluorescent material. The base paper 35 has two recording tracks 361 and 362 which are parallel to each other and extend along the base paper 35. Data patterns are formed by fluophor strips 371, 372, 373, . . . on each of the tracks 361 and 362 of the base paper 35. More specifically, a sync clock signal pattern shown in FIG. 7A is formed on the track 361. As shown in FIG. 7B, a data pattern which comprises binary data of logic level "1" or "0" corresponding to the clock signal is recorded on the track 362. The two surfaces of the base paper 35 are laminated and reinforced by transparent plastic films 381 and 382, thereby obtaining the information card 34.

The width of the fluophor strips on the track 361 shown in FIG. 7A (measured lengthwise of the track) is about half that of those on the track 362. The data are read out from the tracks 361 and 362 and are converted by the NRZ (non-return-to-zero) conversion method. When a data signal is present in a fluophor strip position corresponding to the clock, logic level "1" is set. However, if no data signal is present, logic level "0" is set. In this case, the widths of the slits 201 and 202 fall in a range between the widths of the fluophor strips on the tracks 361 and 362. The clock signal and the data signal in FIGS. 7A and 7B illustrated. However, in fact, the base paper 35 has the same color as that of the fluophor, so that the signal patterns cannot be visually observed.

When the operator inserts the information card 34 in the reader 10 through the card insertion port 341, light beams from the light-emitting elements 151 and 152 are incident to scan the tracks 361 and 362, respectively. The light beams transmitted through the card 34 are guided to the filters 231 and 232 through the slits 201 and 202.

Since light-emitting diodes constitute the light-emitting elements 151 and 152 in this embodiment, the infrared rays which have a wavelength λa are transmitted to the filters 231 and 232 respectively through the slits 201 and 202 when the slits 201 and 202 correspond to nonrecorded portions of the tracks. When the slits 201 and 202 oppose the fluophor strips on the tracks, the fluophor is excited to emit light beams which have a wavelength λb, so that light having a wavelength of λa+λb is incident on the filters 231 and 232. In fact, the light beams having the wavelength λa are not passed through the filters 231 and 232, while the light beams having the wavelength λb are passed therethrough and are detected by the light-receiving elements 241 and 242, respectively. In other words, the data pattern formed by the fluophor strips on the tracks 361 and 362 is detected by the light-receiving elements 241 and 242. In this case, since the light-receiving elements 241 and 242 comprise photodiodes which have a sensitivity peak in the vicinity of the wavelength λb, the clock signal and the data signal can be effectively detected. These signals are NRZ-converted by a signal processor.

Figure 10:
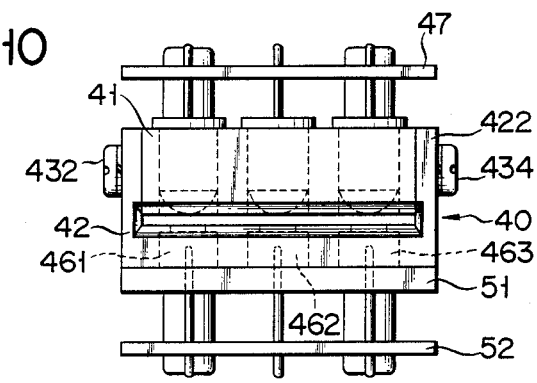
FIG. 10 is a side view of the reader shown in FIG. 8.

FIGS. 8 to 10 show a reader 40 of an information reading/processing system according to a second embodiment of the present invention. A first member 41 and a second member 42 are coupled by legs 421 and 422 which are formed on the second member 42, and are fixed by screws 431 to 434. A card insertion path 44 is formed between the first and second members 41 and 42. An information card can be inserted at a card insertion port 441 at one end of the card path 44.

First to third guide holes are formed in the first member 41 so as to open to the card insertion port 44 and are aligned in a direction perpendicular to the card insertion direction. First to third light-emitting elements 451 to 453 which comprise open-type infrared diodes are fitted in the guide holes such that the light-emitting points thereof are sufficiently close to the card path 44. Photodetector chambers 461, 462 and 463 are formed in the second member 42 so as to oppose the light-emitting points of the light-emitting elements 451 to 453. The terminal wires of the light-emitting elements 451 to 453 are connected to a circuit board 47 screwed above the first member 41 through collars.

Figure 11:
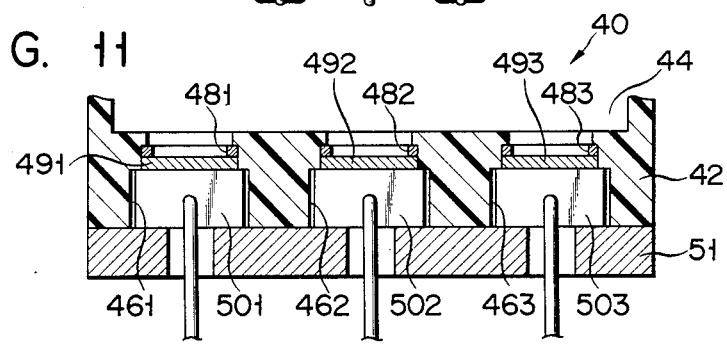
FIG. 11 is an enlarged sectional view showing a photodetector unit of the reader shown in FIGS. 8 to 10.
Figure 12:
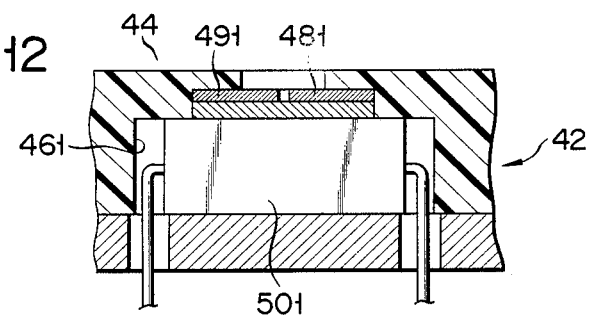
FIG. 12 is a sectional view showing one type of photodetector housed in a chamber of the photodetector unit shown in FIG. 11.

As shown in FIG. 11, the photodetector chambers 461 to 463 respectively communicate with the card path 44 through the openings, a section whereof is partially illustrated in FIG. 12. Slit plates 481, 482 and 483 are brought into tight contact with the openings, respectively. Filters 491, 492 and 493 are adhered on inner surfaces of the slit plates 481, 482 and 483 which define the photodetector chambers 461, 462 and 463, respectively. The light beams transmitted through the slit plates 481 to 483 and the filters 491 to 493 are detected by light-receiving elements 501, 502 and 503, respectively. The light-receiving elements 501 to 503 are respectively held by a holder 51 in the chambers 461 to 463. The holder 51 is mounted by screws on the second member 42; these screws are also used to fix a circuit board 52.

The filters 491 to 493 comprise light-absorbing filters of a monocrystalline semiconductor which has a thickness of 1 mm or less. Therefore, the filter elements tend to be damaged by external vibration or impact.

Figure 13A:
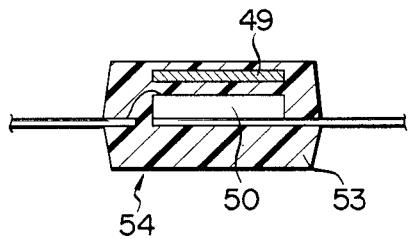
FIG. 13A is a sectional view of another type of photodetector used in the photodetector unit in FIG. 11.

In order to protect the filters against such external vibration or impact, it is very effective to arrange the photodetector unit in a manner as shown in FIG. 13A. More specifically, the filter 49 (491, 492 or 493) is embedded with the light-receiving element 50 (501, 502 or 503) in a transparent plastic case 53 such that the filter 49 is spaced apart from the light-receiving element 50 by a predetermined distance so as to obtain an integral photodetector 54.

Figure 13B:
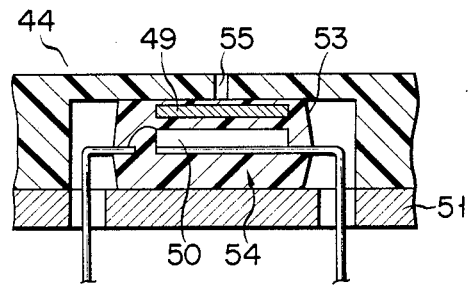
FIG. 13B is a sectional view of the photodetector (FIG. 13A) housed in the corresponding chamber.

The photodetector 54 is mounted in the photodetector chamber 46 formed in the second member, as shown in FIG. 13B. In this case, the opening of the chamber 46 (461, 462 or 463) which communicates with the card path 44 may be utilized as a slit 55.

Figure 14A:
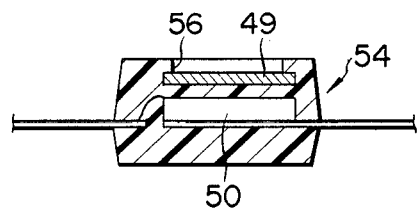
FIGS. 14A to 14D are sectional views showing modifications of the photodetector, respectively.
Figure 14B:
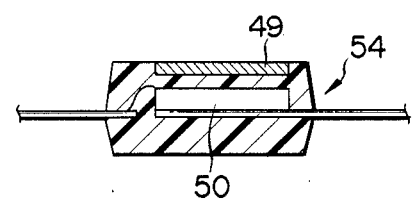
Figure 14C:
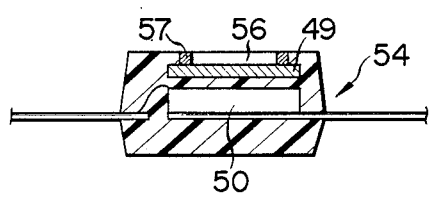
Figure 14D:
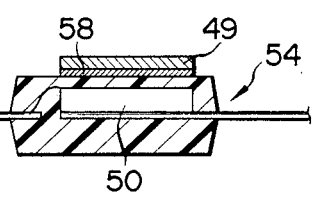

FIGS. 14A to 14D show modifications of the photodetector 54. Referring to FIG. 14A, a window 56 is formed on the plastic case 53 so as to oppose the light-receiving surface of the filter 49, so that the light passing through the slit is effectively incident on the filter 49. In this case, the window 56 need not actually be formed; as shown in FIG. 14B, the filter 49 may be exposed so as to be at the same level as that of the outer surface of the plastic case 53. However, when the window 56 is formed, a protective member 57 such as an O-ring or a bushing is mounted on a portion of the case which defines the window 56, as shown in FIG. 14C. The filter 49 is thus firmly protected. On the other hand, as shown in FIG. 14D, only the light-receiving element 50 may be embedded in the plastic case 53, and the filter 49 may be adhered by an adhesive 58 to the outer surface of the plastic case 53, thereby sufficiently improving the resistance of the filter 49 to vibration and impact.

Figure 15:
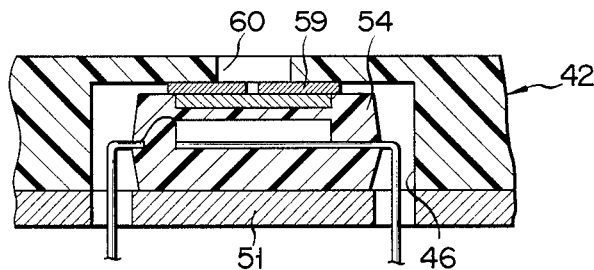
FIG. 15 is a sectional view of the photodetector (FIG. 14B) in the corresponding chamber.

The photodetector 54 is then housed in the photodetector chamber 46, as shown in FIG. 13B. However, as shown in FIG. 15, the photodetector 54 may be housed such that the filter 49 is adhered to a slit plate 59. In this case, the chamber 46 can communicate with the card path 44 through an opening 60 sufficiently larger than the slit formed in the slit plate 59.

Figure 16A:
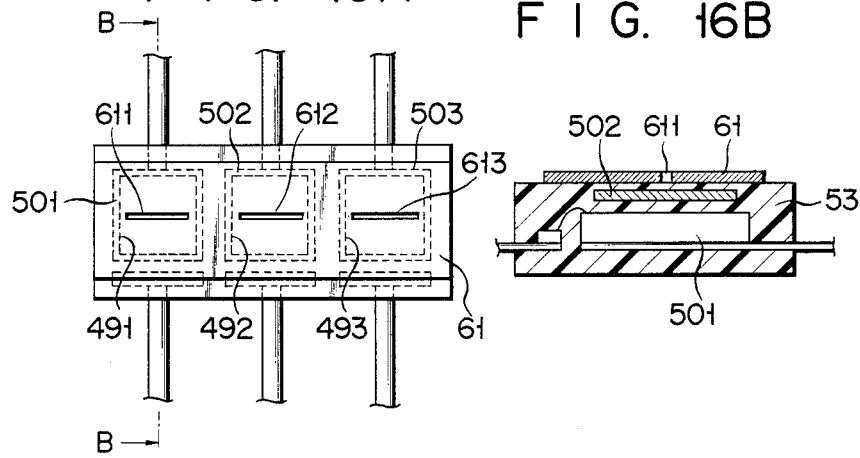
FIG. 16A is a plan view of a photodetector unit which has three photodetectors.
Figure 16B:
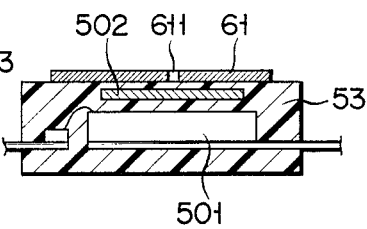
FIG. 16B is a sectional view of the photodetector unit shown in FIG. 16A taken along the line B—B.

The reader 40 according to the above embodiment comprises a photodetector unit which has three photodetectors disposed independently of each other. However, these photodetectors need not be separately arranged. As shown in FIGS. 16A and 16B, the photodetectors may be integrally arranged. In this case, the three light-receiving elements 501, 502 and 503 are disposed in tandem with each other, and the filters 491, 492 and 493 are spaced apart from the light-receiving elements 501, 502 and 503 by a predetermined small distance. The entire structure is then embedded in a single plastic case 53. A slit plate 61 which has slits 611, 612 and 613 therein, respectively corresponding to the light-receiving elements 501 to 503, is adhered to the upper surface of the plastic case 53 or is molded integrally with the plastic case 53, thus resulting in convenient handling.

Figure 17:
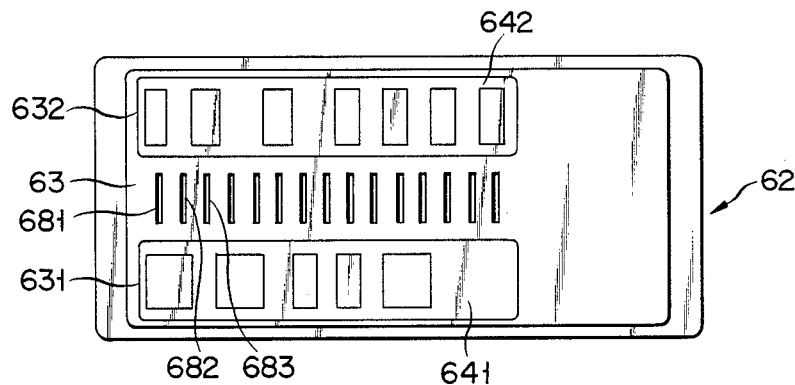
FIG. 17 is a plan view of an information card used for a reader according to a second embodiment of the present invention.

FIG. 17 shows an information card 62 used for the reader 40. The information card 62 has a track 63 which has the clock signal thereon and data tracks 631 and 632 which have data signals thereon. The tracks 63, 631 and 632 correspond to the light-emitting elements 452, 451 and 453, respectively. The light beams passing through the tracks are detected by light-receiving elements 502, 501 and 503 through the filters, respectively.

Figure 18:
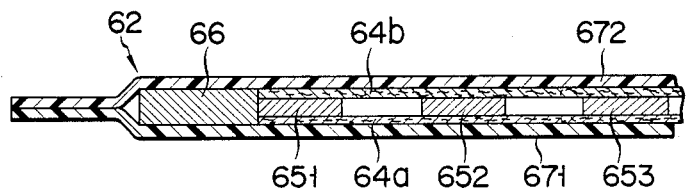
FIG. 18 is an enlarged sectional view showing part of the data recorded portion of card in FIG. 17.

The tracks 631 and 632 are constructed such that data patterns are formed of fluophor strips on rectangular light-transmitting base paper members 641 and 642. FIG. 18 is a sectional view of a portion of the information card which corresponds to the track 631. The base paper member 641 is obtained by adhering two paper sheets 64a and 64b. Fluophor strips 651, 652, 653, . . . , of a data pattern are sandwiched between the paper sheets 64a and 64b.

The base paper members 641 and 642 are fitted in a groove so as to abut against a reinforcing member 66 of a stainless steel spring or a plastic material, so that the base paper members 641 and 642 and the reinforcing member 66 are arranged to form a sheet-like body. The sheet-like body is coated with pouched sheets 671 and 672 of a polyester film, thereby obtaining the information card.

In this case, the track 63 is formed between the base paper members 641 and 642 so as to oppose the reinforcing member 66. The clock signals are recorded on the track 63 by punched apertures 681, 682, 683, . . . . However, the track 63 may be formed in the same manner as in the tracks 631 and 632. However, the clock signal information is not confidential, so that the clock signal information can be formed by the punched apertures. In this case, the filter 492 of the reader 40 need not be used.

The data recorded on the tracks 631 and 632 may be recorded independently of each other. However, the same data may be recorded on both the tracks 631 and 632. If the data pattern of the track 631 is the same as that of the track 632, the upper and lower surfaces of the information card need not be distinguished.

Figure 19:
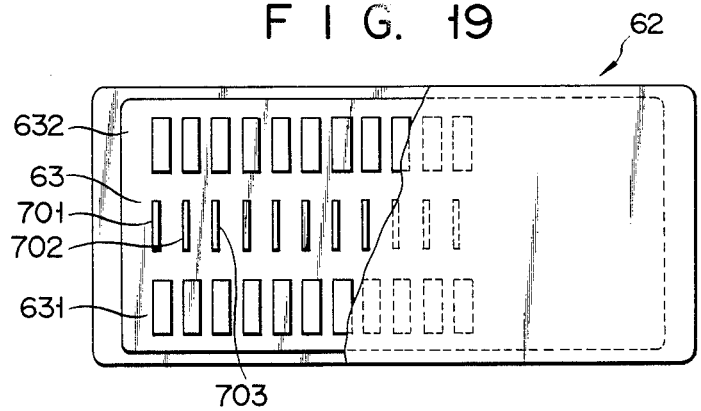
FIG. 19 is a partial cutaway view of another information card.
Figure 20:
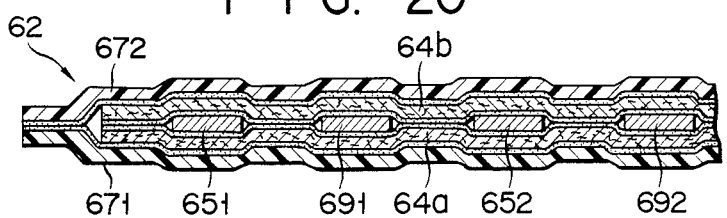
FIG. 20 is an enlarged sectional view of part of the data recorded portion of the information card shown in FIG. 19.

FIGS. 19 and 20 show another information card 62. The information card 62 comprises fluophor strips 651, 652, . . . , and so on of a data pattern, and layers 691, 692, . . . , and so on of a material having the same light transmittance as the fluophor strips and the other layers. The fluophor strips and the other layers are arranged to oppose clock signals 701, 702, . . . , and are sandwiched between two paper sheets 64a and 64b. The adhered paper sheets 64a and 64b are covered with pouched sheets 671 and 672, thereby obtaining the information card 62. In this manner, layers having the same transmittance as that of the fluophor strips are disposed in portions where the fluophor strips are not present, so that the recorded data is difficult to observe.

What we claim:

1. An information card in which data is recorded, comprising:

rectangular base paper means made of a material which is adapted to transmit at least one infrared component of fluorescent light rays, this base paper means having two opposite, longer side edges, two opposite, shorter end edges, and two opposite faces;

information recording track means disposed on one face of said base paper mean such that said track means is parallel to one said edge of said base paper means, said track means including an information pattern formed of fluorescent strips, said information pattern being constituted at least in part by a code pattern of fluorescent strips in said track means, said fluorescent strips being adapted to be excited upon reception of infrared light rays of a first predetermined wavelength, and in response to such reception to emit infrared light rays having second predetermined wavelength which rays of said second predetermined wavelength are capable of passing through said base paper means so that said rays of said second wavelength may be sensed from an opposite face of said paper means; and reinforcing sheet means including a film which is secured on each face of said base paper means in covering relation thereto, this film being one which is adapted to transmit infrared light rays therethrough;

said base paper means being substantially the same in color within the humanly-visible spectrum as said information pattern.

2. An information card according to claim 1, wherein:

said track means includes first and second tracks which are parallel to said side edges of said rectangular base paper means, said first track having a synchronous-signal pattern of fluorescent strips arranged at predetermined intervals, and said second track having a binary-data pattern formed of fluorescent strips arranged in a predetermined relationship with the fluorescent strips of said synchronous-signal pattern.

3. An information card according to claim 1, wherein:

said information pattern is constituted at least in part by fluorescent printing disposed on said base paper means.

4. An information card according to claim 1, wherein:

said track means includes first, second and third tracks which are parallel to said side edge of said rectangular base paper means;

said second track is located between said first and said third tracks;

a synchronous signal having a periodic signal pattern is recorded in said second track; and binary data is recorded in each of said first and third tracks such that the binary data is recorded at positions corresponding to the signal pattern of said synchronous signal.

5. An information card according to claim 4, wherein:

the data recorded in each of said first and second tracks is in the form of a fluorescent strip pattern; and the synchronous signal recorded in said second track is in the form of an array of apertures provided in said base paper means to permit light rays to pass therethrough.

6. An information card according to claim 5, wherein:

the data recorded in said first and third tracks are each in the form of a fluorescent strip pattern different from one another.

7. An information card according to claim 5, wherein:

the data recorded in said first and third tracks are each in the form of a fluorescent strip pattern representing the same information but relatively reversed in sequence.

8. An information card according to claim 1, wherein:

said base paper means comprises first and second layers of base paper, and said information pattern is formed between said first and second layers of base paper such that a fluorescent layer is sandwiched between said first and second layers of base paper.

9. An information card according to claim 1, further comprising:
  a card-shaped reinforcing member having an opening; and
  said base paper means being fitted into said opening of said card-shaped reinforcing member such that said reinforcing sheet means is also covers said reinforcing member.

10. An information card according to claim 9, wherein:
  said reinforcing member is constituted at least in part by an elastic plate made of metal.

11. An information card according to claim 9, wherein:
  said reinforcing member is constituted at least in part by an elastic plate made of synthetic resin.

12. An information card in which data is recorded, comprising:
  rectangular base paper means made of a material which is adapted to transmit at least one infrared component of fluorescent light rays, this base paper means having two opposite, longer side edges, two opposite, shorter end edges, and two oppoite faces;
  information recording track means disposed on one face of said base paper means such that said track means is parallel to one said edge of said base paper means, said track means including an information pattern formed of fluorescent strips, said information pattern being constituted at least in part by a code pattern of fluorescent strips in said track means, said fluorescent strips being adapted to be excited upon reception of infrared light rays of a first predetermined wavelength, and in response to such reception to emit infrared light rays having second predetermined wavelength which rays of said second predetermined wavelength are capable of passing through said base paper means so that said rays of said second wavelength may be sensed from an opposite face of said paper means; and
  reinforcing sheet means including a film which is secured on each face of said base paper means in covering relation thereto, this film being one which is adapted to transmit infrared light rays therethrough;
  said track means further comprising non-fluorescent strips interspersed with said fluorescent strips in said track means and being substantially the same in light transmittance within the humanly-visible spectrum, so that data recorded by means of said fluorescent strips are difficult to detect by naked eye.

13. An information card according to claim 12, wherein:
  the material for forming said auxiliary pattern produces light having a color similar to that of a fluorescent material.

* * * * *